(12) United States Patent
Oare et al.

(10) Patent No.: US 6,427,742 B2
(45) Date of Patent: Aug. 6, 2002

(54) PNEUMATIC TIRE HAVING SPECIFIED BEAD STRUCTURE

(75) Inventors: Thomas Reed Oare, Suffield; Earl Donald Hughes, Akron, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 56 days.

(21) Appl. No.: 09/765,003

(22) Filed: Jan. 18, 2001

Related U.S. Application Data

(63) Continuation-in-part of application No. PCT/US98/23275, filed on Nov. 2, 1998.

(51) Int. Cl.⁷ .................. B60C 15/02; B60C 15/024; B60C 15/04
(52) U.S. Cl. .............. 152/540; 152/539; 152/544
(58) Field of Search .................. 152/539, 540, 152/544; 245/1.5

(56) References Cited

FOREIGN PATENT DOCUMENTS

JP          11129710 A   *   5/1999   .................. 152/540

* cited by examiner

Primary Examiner—Adrienne C. Johnstone
(74) Attorney, Agent, or Firm—David E. Wheeler

(57) ABSTRACT

A radial ply pneumatic tire (10) features a bead core (20) which comprises an arrangement of filaments (26) positioned relative to one another. The bead core (20) has a cross-section and a radially inward base side (44). In the cross section, the base side (44) of the bead core (20) has a width which is substantially linear and is between 50% to 75% of the rim seat width. The bead core base side (44) is inclined at least 15° relative to the bead's axis of rotation, while the bead heel surface has an as molded inclination at the central portion (61) radially inward of the bead base (44) at an angle of at least 10° with respect to the bead's axis. The tire (10) further has a unique toeguard chafer (66) compound that is cut resistant.

7 Claims, 5 Drawing Sheets

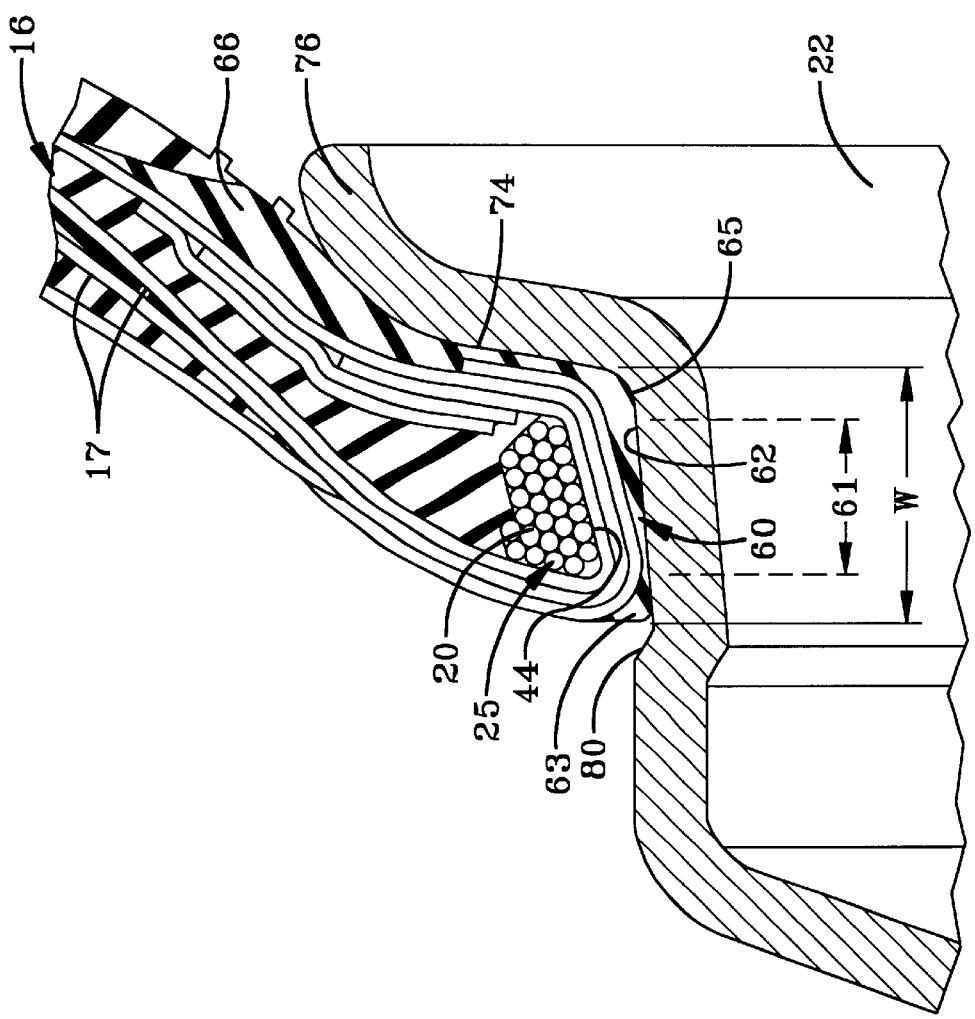
FIG-4
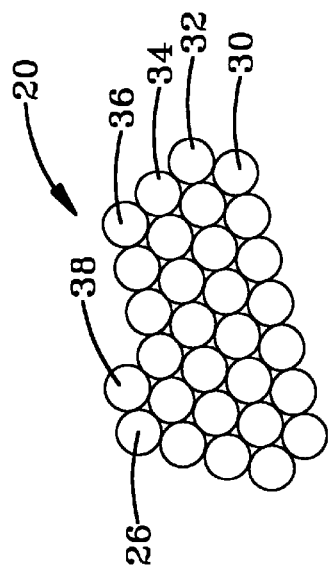
FIG-2
FIG-3

PNEUMATIC TIRE HAVING SPECIFIED BEAD STRUCTURE

This application is a continuation-in-part of pending international application No. PCT/US98/23275, filed Nov. 2, 1998.

FIELD OF INVENTION

The present invention relates generally to pneumatic tires, and more specifically to pneumatic tires designed to remain affixed to and in operative association with the vehicle rim even upon deflation of the tire. Some varieties of these tires include devices designed to support the vehicle when the tire loses inflation pressure. Such tires are commonly known as "run-flat" tires.

DESCRIPTION OF THE PRIOR ART

The performance of a tire depends on the retention of pressurized air within the tire. Upon a condition where the pressurized air in the tire escapes, such as when the tire is punctured by a nail or other road hazard, performance of the tire can diminish rapidly. In most cases, the vehicle can only be driven a very short distance before it becomes inoperable.

One problem in providing continued performance upon deflation of a tire is retention of the tire on the rim. Since the tire is normally retained on the rim by the pressurized air within the tire, pushing the beads and sidewalls of the tire outwardly against a rim flange, the escape of the pressurized air through a puncture or other means, eliminates the inner pressure. Absent this pressure, the tire may slip off the rim, and control of the vehicle becomes difficult.

Previous efforts to prevent separation of the tire from the rim have used a special rim/tire combination. One of the reasons this solution has not been widely implemented is the high cost of the special rims which are required. Also, rim/tire combinations of this type sometimes require special mounting procedures and/or equipment. For these reasons, they have never been commercially acceptable.

There was perceived a need for a new tire which could stay connected to a conventional rim, even in a deflated condition, without the requirement of a special rim. In other words, a tire which could be mounted to any conventional rim, but which would be retained upon the rim upon tire deflation and would continue to provide acceptable driving performance for an acceptable distance.

Efforts by others to address this need include European Patent application 0 475 258 A1; U.S. Pat. No. 5,131,445; U.S. Pat. No. 3,954,131; U.S. Pat. No. 4,193,437; U.S. Pat. No. 4,261,405, and European Patent application 0 371 755 A2.

Charvat, in U.S. Pat. No. 4,794,967, issued Jan. 3, 1989, discloses a tire having a bead ring comprising a stack of ribbons having a curved shape. The concavity of the ribbons is described as facing the axis of rotation of the tire. The ribbons also have an angle $\alpha \geq \beta+5$ (where $\beta$ is positive) or an angle of $\alpha \geq 5$ if $\beta$ is negative. $\beta$ is defined as the angle of the bead seat of the rim, and $\alpha$ and $\beta$ are expressed in degrees.

In addition, several other attempts have sought to develop a bead configuration having certain advantageous properties and configurations. For example, in U.S. Pat. No. 4,203,481 a run-flat tire is disclosed which is to be used in association with a special rim. In U.S. Pat. No. 1,914,040, a tire bead is disclosed having a rectangular configuration. Further, in U.S. Pat. No. 1,665,070, a tire bead is disclosed having a triangular configuration.

In commonly owned U.S. Pat. No. 5,679,188 and U.S. Pat. No. 5,368,082, which are incorporated herein by reference, an innovative run-flat device utilized an inventive bead core which satisfies the needs of run-flat tires.

The inventive tire as described below has a bead core which retains its shape without requiring an additional step of pre-curing the rubber coated core. This is made possible by the shape and angular orientation of the cross-section sides of the bead core, and their angular relationship with the surrounding elastomeric heel and toe surfaces as described below.

Heike van de Kerkhof of DuPont®, at Tire Technology International 1997, pp. 52–55, describes the use of Kevlar® brand fibers in high performance tires, and suggests the use for such fibers can be extended to standard passenger tires. At page 54, the suggestion is made that some fabrics can be replaced by fiber loaded composites.

EPA 0329589 of The Goodyear Tire & Rubber Company describes aramid-reinforced elastomers. The aramid reinforcement is described as short, discontinuous, fibrillated fibers. The reinforced elastomers are used as components of pneumatic tires, where the components can be reinforcing belts, sidewall members in the region of the beads, a belt overlay, edge strips or tread.

SUMMARY OF THE INVENTION

The present invention relates to a pneumatic tire (10) which can be used on a conventional rim (22) and which will be retained on the rim (22) even upon deflation of the tire (10). The inventive tire (10) is a vulcanized radial ply pneumatic tire having a pair of axially spaced annular beads. Each of the beads (25) has a substantially inextensible bead core (20) which comprises a coil of round wire filaments (26) or a single continuous filament (26), which is built into the toroidally-shaped tire (10) prior to its vulcanization. At least one radial ply (17) extends between the beads (25) and is preferably turned radially outwardly around the bead cores (20). The bead core (20) is further characterized by a polygonal cross section having a radially-inward base side (44), the base side (44) having a first edge (54), a second edge (56) and a length extending between the first and second edges, a radially outward side (46), a first side (48) and a second side (50). The first and second sides (48) and (50) extend from the base side (44) toward the radially outward side (46). The first side (48) meets the base side (44) through first edge (54) and the second side (50) meets the base side (44) through second edge (56).

The inventive tire (10) can be used in connection with a rim (22) having a flange (76) and a hump (80). A bead heel surface (60) on the tire (10) can be configured to have a length between 85% and 100% of the distance W between the hump (80) and an axially inward surface (74) of the flange (76), contributing to the tire (10) remaining on the rim (22) during a deflated condition. Wire filaments (26) or filament windings in a first wire layer of the bead core can be configured so that a relatively wide, stiff first layer can be constructed, further contributing to the retention of the tire (10) on the rim (22) upon a deflated tire condition.

The bead core base side (44) is inclined at an angle $\alpha$ of 15° to 30°, preferably 15° to 25° relative to the axis of rotation of the bead core, which should be coincident with the tire axis of rotation when mounted on the tire's design rim, the length of the base side (44) being at least 50% of the width of the bead heel surface (60), preferably in the range of 50% to 85% of the width of the bead heel surface (60).

The bead heel surface (60) has a central portion (61), a heel portion (65) and a toe portion (63). The central portion

(61) is radially inward of the bead base side (44) and has an angle β of 10° or greater relative to the bead core axis of rotation and at least 4° less than the angle α of the base side (44). The central portion (61) has a width of at least 50% of the length of the base side (44), preferably 50% to 100% of the length of the base side (44).

In the illustrated embodiment, the bead heel (65) has a radius of about 0.25 inch (0.64 cm).

Also included in the invention is a rubber composition comprising, in parts by weight per 100 parts rubber (phr): 90-40 phr cis-1,4-polybutadiene rubber, 10–60 phr polyisoprene, 40–100 phr carbon black, and 0–30 phr silica. The rubber composition of the invention has a 300% modulus of 8 to 13 MPa, a tensile strength at break of 13 to 19 MPa, an elongation at break of 300 to 600%, RT Rebound of 48 to 58, a tan delta at 10% strain and 100° C. of 0.13 to 0.19, G' at 1% strain of 1900 to 2700 KPa, and a G' at 50% stain of 700 to 1100 KPa. In one embodiment of the compound of the invention, the compound may also include 0.5 to 6 phr kevlar pulp.

Also claimed is a tire rubber component made using a compound of the invention.

BRIEF DESCRIPTION OF THE DRAWINGS

Other aspects of the invention will become apparent from the following description when read in conjunction with the accompanying drawings wherein:

FIG. 2 is a cross-sectional view of a bead core according to the invention;

FIG. 3 is a schematic view of the cross-sectional bead core of FIG. 2 with line segments drawn to show the perimeter, angles, and geometrical characteristics of the bead core of FIG. 2;

FIG. 4 is an enlarged cross-sectional view of a portion of FIG. 1 showing the bead core and bead area of the tire as it fits onto an associated rim.

DESCRIPTION OF THE ILLUSTRATED EMBODIMENT

Figure 1:
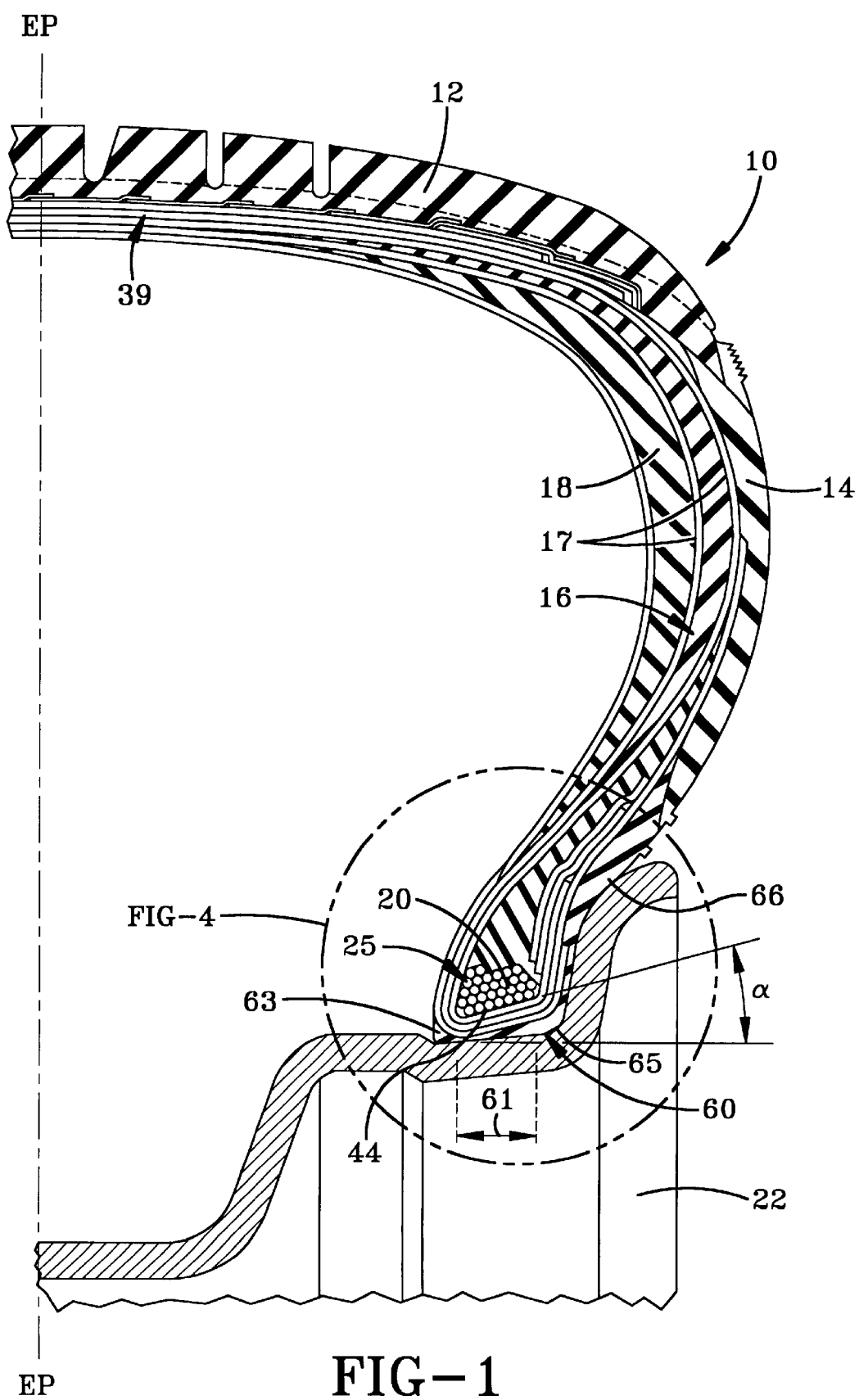
FIG. 1 is a cross-sectional view of one half of a tire and rim according to the invention, the tire and rim being cut along their equatorial plane.

The invention also may be better understood in the context of the following definitions, which are applicable to both the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial-Ply tire" means a belted or circumferentially-restricted pneumatic tire in which the ply cords which extend from bead to bead are laid at cord angles between 65 degrees and 90 degrees with respect to the equatorial plane of the tire.

"Equatorial plane (EP)" means the plane perpendicular to the tire's axis of rotation and passing through the center of its tread.

"Carcass" means the tire structure apart from the belt structure, tread, under tread, and side wall rubber over the sides, but including the bead.

"Belt structure" means at least two layers or plies of parallel cords, woven or unwoven, underlying the tread, unanchored to the bead and having both left and right cord angles in the range from 17 degrees to 27 degrees with respect to the equatorial plane of the tire.

"Sidewall" means that portion of the tire between the tread and the bead.

"Tread" means a molded rubber component which, when bonded to a tire casing, includes that portion of the tire that comes into contact with the road when the tire is normally inflated and under normal load.

"Tread width" means the arc length of the tread surface in the axial direction, that is, the plane passing through the axis of rotation of the tire.

"Section width" means the maximum linear distance parallel to the axis of the tire and between the exterior of its sideways when and after it has been inflated at normal pressure for 24 hours, but unloaded, excluding elevations of the sidewalls due to labeling, decorations, or protective bands.

"Section height" means the radial distance from the nominal rim diameter to the maximum outer diameter of the tire at the road contact surface nearest its equatorial plane.

"Aspect ratio" of the tire means the ratio of its section height to its section width.

"Axial" and "axially" are used herein to refer to the lines or directions that are parallel to the axis of rotation of the tire.

"Radial" and "radially" are used to mean directions radially toward or away from the axis of rotation of the tire.

"Inner" means toward the inside of the tire.

"Outer" means toward the tire's exterior.

In the drawings the same numbers are used for the same components or items in the several views.

With reference now to FIG. 1, there is illustrated a pneumatic tire (10) and rim (22). The illustrated embodiment of the invention are run-flat passenger car tires of size P255/45ZR17 and P285/40ZR17, although the invention is applicable to other types and sizes of tires. The pneumatic tire (10) comprises a tread (12), sidewalls (14), a belt reinforcing structure (39), a carcass (16) having at least one ply (17), and a pair of annular tensile members, commonly referred to as "bead cores" (20) located in bead portions (25), and a run-flat device (18) in the sidewalls of the tire (10). For ease of illustration, only one half of the tire (10) is shown, with the tire being split along its equatorial plane EP.

Figure 5:
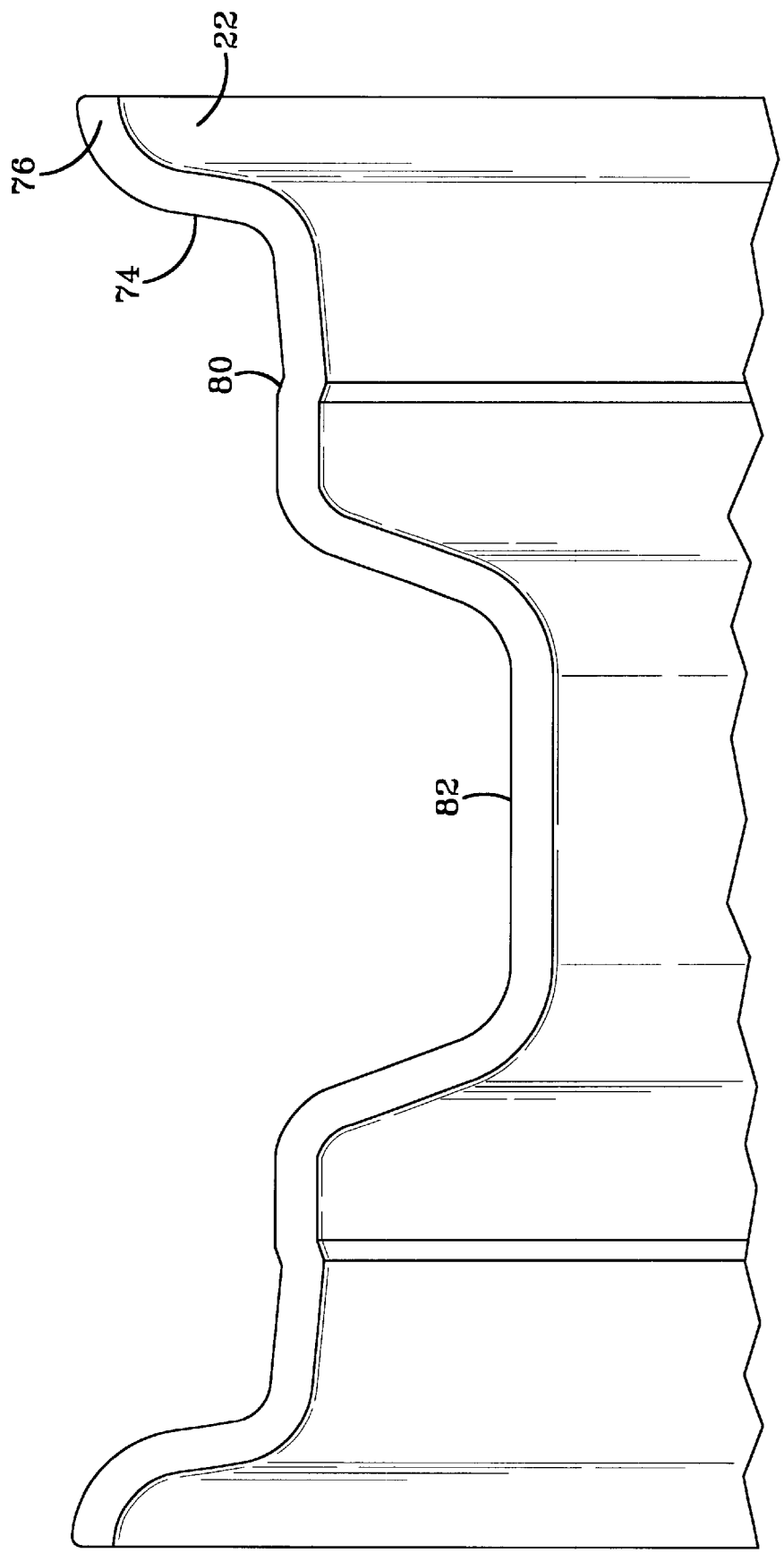
FIG. 5 is a partial cross-sectional view of the design rim onto which the tire 10 can be mounted.

With reference to FIGS. 4 and 5, the tire (10) fits onto and works in conjunction with an associated design rim (22).

With reference to FIG. 2, bead core (20) is shown in cross-section and comprises a plurality of wire filaments (26). In the illustrated embodiment, the bead core (20) is comprised of a single continuous filament which is repeatedly annularly wound into an annulus. In other words, each of the filaments (26) shown in cross-section in FIG. 2 are a part of the same continuous filament wound into the bead core (20). Although a single continuous filament is the illustrated embodiment of the invention, the invention can be successfully practiced using separate, discrete filaments wound into a similar annular configuration. One common such configuration is known as a "strap bead."

The term "filaments 26" as used in the description of the present invention indicates either filament windings of a single continuous filament or a plurality of discrete filaments wound into an annular configuration.

In the illustrated embodiment, the filaments are comprised of a single strand of 0.050 inch (0.127 cm) diameter wire which is individually coated with 0.005 inch (0.0127 cm) of elastomeric material. Therefore, filament (26) has an overall diameter of 0.060 inch (0.1524 cm). The filaments (26) may have an overall diameter of between 0.045 inch (0.114 cm) and 0.080 inch (0.203 cm).

The bead core (20) illustrated in FIG. 2 comprises five layers 30, 32, 34, 36, 38 of filaments 26. The first layer (30) is the most radially inward layer and comprises seven filaments (26). The first layer (30) has a first width between 0.315 inch (0.80 cm) and 0.560 inch (1.422 cm). The third layer also has seven filaments and a third width equal to the width of the first layer.

The second layer (32) is radially outward of the first layer (30) and comprises eight filaments (26). The filaments of adjoining layers, (30, 32), are "nested" together. In other words, the filaments (26) are offset axially by a distance equal to about one half the diameter of a filament (26) so that the radially inwardmost portion of the outer surfaces of the filaments (26) in the second layer (32) lie radially inwardly of the radially outwardmost portion of the outer surface of filaments (26) in the first layer (30). The second layer (32) has a second width of between 0.360 inch (0.914 cm) and 0.640 inch (1.626 cm).

The fourth layer (34) comprises six filaments (26), and the radially outward most layer, the fifth layer (38), comprises two filaments (26). The fourth layer (34) has a fourth width of between 0.027 inch (0.686 cm) and 0.480 inch (1.219 cm), and the fifth layer (38) has a fifth width of between 0.090 inch (0.229 cm) and 0.160 inch (0.406 cm). As can be seen best in FIGS. 2 and 3, the two filaments (26) of the fifth layer (38) are offset toward the first side (48) of the bead core (20).

The bead core (20) when viewed in a cross-section, has a perimeter (42). The perimeter (42) comprises the lengths of imaginary line segments contacting and tangent to outer surfaces of filaments (26). The perimeter has a base side (44), a radially outermost side (46), a first side (48), and a second side (50). The radially outermost side (46) can have a variety of configurations without significantly affecting the performance of the inventive bead core (20). For example, the bead core (20) could take the form of an isosceles triangle, or the top surface of a rhombus. In the case of a triangular bead core, the radially outermost side (46) would form a point in cross-section.

The base side (44) is the radially innermost side of the bead core (20) and is inclined relative to the tire's axis of rotation as well as the mating surface of the rim (22). In the illustrated embodiment, the first side (48) is axially inward of the second side (50).

The first side (48) extends between the base side (44) and the radially outermost side (46). The first edge (54) is at the axially innermost filament (26) of the base side (44).

The second side (50) extends between the base side (44) and radially outermost side (46). The second edge (56) is the axially outermost filament (26) along the base side (44) and the perimeter segment (50).

The perimeter (42) of the bead core (20) defines a cross-section of the bead core. In the illustrated embodiment, the bead core perimeter (42) has at least five sides, with the longest side being the base side (44).

In the manufacture of similar prior art tires, the tires are made with a flat bead heel surface and a flat based (zero degree angle) bead core, and are cured on a mold ring having a 10° angle. In the illustrated tire of the invention, the bead core is wound with a base (44) having an angle α, with respect to the axis of the tire, of greater than 15°, and the tire is cured in a mold having a mold ring angle of 15°. The cured bead surface (60) has an angle β, relative to the axis of the tire, of between 10° and 15°.

When bead core (20) is formed from a continuous wire or filament (26), the first winding of the wire corresponds to the first edge (54) of the bead core (20), and the first layer (30) is laid down first, and the wires or filaments of second layer (32) are laid down in reverse order (as compared to layer (30)), nesting with the wires or filaments of layer (30). The angle α of the layup, together with the nesting of the subsequent layers of wires or filaments, tends to lock in first edge (54), and to direct all the compressive forces of the bead toward first edge (54). The bead core (20) has at least one axially inner wire or wire winding and at least one axially outer wire or wire winding. The plane tangent to the at least one axially inner wire or wire winding and the plane tangent to the at least one axially outer wire or wire winding are parallel to each other and perpendicular to the axis of rotation after the tire is cured.

With reference to FIG. 4, the tire (10) has a bead area which includes a bead heel surface (60). The bead heel surface (60) cooperates with the associated rim (22). An important aspect of the invention is that the rim (22) is a conventional design rim as specified for the illustrated tire by industry standards, such as the Tire and Rim Association Yearbook, which is incorporated herein by reference. For example, the rim used with the illustrated embodiment of the tire in the sizes referred to earlier (i.e., P255/45ZR17) is a drop center, 5 degree "J" rim as specified in the Tire and Rim Association Yearbook.

The rim (22) has an axially inner surface (74) of rim flange (76), and has a safety hump (80) which lies axially inward of rim flange (76). The distance between the safety hump (80) and the axially inner surface (74) of the rim flange (76) is referred to herein as the rim seat (62) and has a width equal to a distance W. The distance W for the various rims designed for various vehicles has been standardized in the industry, and is obtainable from the Tire and Rim Association Yearbook. In the design rims to be used with the illustrated embodiment, W is 0.790 inch (2.007 cm).

The width of bead heels of prior art tires relative to the bead seat of the rim are significantly less than the width of the bead heel (60) of the tire of the invention. With continuing reference to FIG. 4, the tire (10) has a bead area which includes a bead heel surface (60). The bead heel surface (60) cooperates with and is a point of interface with the rim (22). In the illustrated embodiment of the invention, the width of the bead heel surface (60), measured in the axial direction, is substantially equal to but not greater than the distance W between the hump (80) and the axially inner surface (74) of the rim flange (76). The configuration of the bead core (20), along with the increased width of the bead heel surface (60), causes the tire (10) to remain seated on the rim (22), even when the tire has air pressure equal to atmospheric pressure.

The bead heel surface (60) has a central portion (61), a heel portion (65) and a toe portion (63). The central portion (61) is radially inward of the bead base side (44) and has an angle β of 10° or greater relative to the bead core axis of rotation and at least 4° less than the angle α of the base side 44. The central portion (61) has a width of at least 50% of the length of the base side, preferably between 50% and 100% of the length of the base side (44).

In the illustrated embodiment, the bead heel (65) has an included angle of about 5° and a radius of about 0.25 inch (0.64 cm).

Figure 1A:
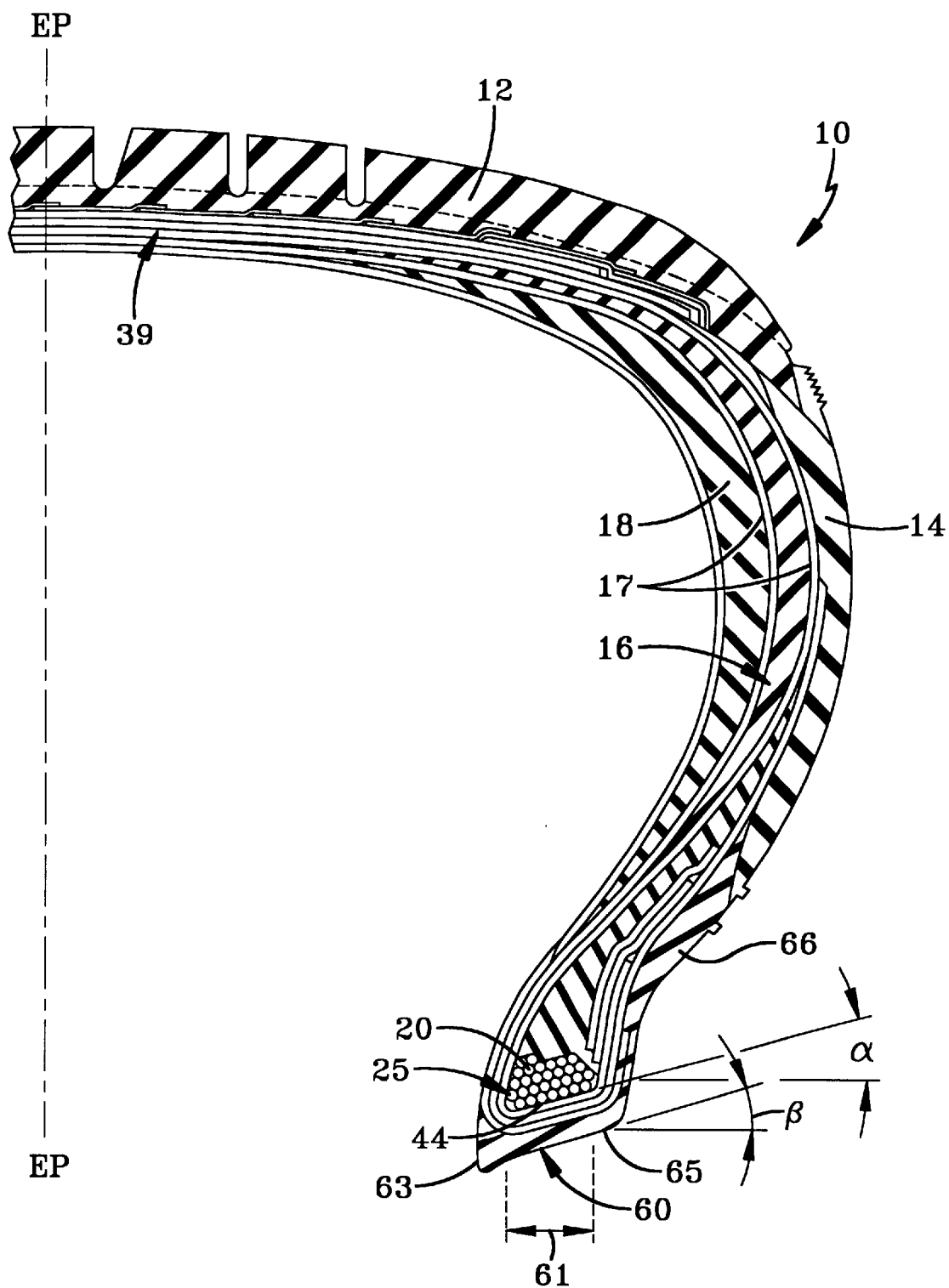
FIG. 1A is a cross-sectional view of the tire (10) of FIG. 1 absent the rim (22)

As is illustrated in FIG. 1A, additional rubber may be used in toe (63) to provide additional compression in the toe area when a tire (10) is mounted on a rim (22).

Because there may be extra rubber in toe (63) and heel (65) is radiused, central portion (61) of the toe surface (60) represents the area of choice for measuring the angle β of toe surface (60).

Through testing of various designs, applicant has learned that one of the key elements of tire/rim design which keeps a tire (10) affixed to a rim (22) in cases of tire deflation, is the design of the base side (44) of the bead core (20) and the bead heel surface (60), and the relationship of the width of the bead heel surface (60) to the width W of rim seat 62. Prior art designs allowed for significant variation in the two dimensions, allowing for some slippage of the bead heel surface (60) of the tire (10) relative to the rim seat (62). For example, the width of the bead heel (60) of one relevant prior art design was 0.650 inch (1.651 cm). The bead heel surface (60) of the inventive tire has a width of 0.750 inch (1.905 cm). Since the width of the rim seat (62) (the distance W) is 0.790 inches (2.0066 cm), the illustrated tire (10) has a bead heel width equal to 95% of the distance W. By matching, or nearly matching the width of the rim seat (62) with the width of bead heel surface (60), the movement between toe (63) and hump (80) is substantially reduced, and the chances that the axially inward most portion of the bead heel surface (60) will ride over hump (80) when the tire is running uninflated are reduced. For a rim seat width of 0.790 inch (2.0066 cm), the bead heel surface (60) could be, for example, between 0.672 inch (1.7 cm) and 0.790 inch (2.0 cm), or between 85% and 100% of the distance W.

Another element of the inventive tire (10) is the width of the first wire or filament layer (30) of the bead core (20). Relevant prior art designs used first layers (30) having a width of 0.276 inch (0.701 cm) while the width of the first layer (30) of the illustrated bead core (20) is 0.420 inch (1.067 cm). Since the width of the rim seat (i.e. "W") is 0.790 inches (2.007 cm), the width of the first layer (30) in the illustrated embodiment is 53% of W. It is believed that in various embodiments of the invention, that the width of the first layer (30) of the bead core (20) will be between 50% and 75% of the distance W.

An important aspect of the bead core (20) is the linearity, in cross section, of the first layer (30). By configuring the filaments (26) of the first layer (30) so that their axial centerlines lie in a common plane, the compressive force between the first layer (30) and the rim seat (62) is substantially uniform.

When a tire (10) of the invention is mounted on a rim (22), the 10° to 15° angle of the toe surface (60) against the 5° angle of the rim seat (62), causes considerable pressure to be exerted on toe (63) by the rim seat, especially when there is extra rubber on toe (63) as illustrated in FIG. 1A. The pressure between the toe surface (60) and the rim seat (62) has a substantially constant gradient from toe (63) to heel (65), where heel (65) encounters somewhat lesser pressure than toe (63). The linearity of bead base (44) helps assure an even pressure gradient.

The angle α of orientation of bead base (44) also helps concentrate pressure on toe (63), which is important since the toe surface (60) is where the seal between the tire (10) and the rim (22) is achieved. This pressure, applied so close to hump (80), also helps reduce the chances that bead surface (60) will ride over hump (80) when the tire in run uninflated.

Analysis of cut cured tire sections indicate that first layer (30) of the bead core (20) retains its linearity throughout the vulcanization process. Prior art bead cores (20) often deform when the carcass (16) "turns up" during the tire building and vulcanization process. The filaments (26) in the inventive bead core (20) are of a larger diameter i.e., 0.050 inch (0.127 cm) as compared to prior design's 0.037 inch (0.094 cm). It is believed the larger diameter filaments (26) contribute to the stability of the bead core (20).

The first layer (30) is configured to be inclined relative to the bead's axis of rotation and the rim seat (62). On the illustrated rim, having a 5 degree drop center "J" bead seat, as per the 1990 Tire and Rim Association Yearbook, the first wire layer (30) of bead core (20) is inclined relative to the rim seat (62) at an angle of 15 degrees or more relative to the bead's axis of rotation, and has at least a 10° angular difference relative to the rim seat (62).

FIG. 5 shows a rim (22) having a drop center (82), as is known in the art. The inventive tire (10) mounts onto a typical drop center rim (22) as any conventional prior art tire would. No special rims are required, nor are any special mounting procedures.

The bead base (44) is inclined at a angle of at least 15°, preferably 15° to 18° relative to the bead's axis, and the bead heel surface (60) is inclined relative to the bead's axis at an angle β of at least 10°, preferably 10° to 15°, the surface (60) being radially inward of the bead base side (44). When the tire (10) is molded, there is at least a 4° angular difference between the bead heel surface (60) and the bead base side (44). It appears that this increase in the rubber mass between the bead base side (44), as it extends axially outward, and the bead heel surface (60) at the central portion (61) extending to the heel (65), creates an advantage in maintaining the stability of the bead core (20) during the molding process.

In prior development, based on a belief that distortions could be eliminated if the molded central portion (61) and the bead base (44) had the same inclination relative to the tire's axis, tires were made having such parameters. Testing using a bead base (44) having a 10° inclination relative to the bead's axis, and a bead heel surface central portion (61) having a similar angle of 10°, yielded a bead core that was subject to bead core twisting. Using angles of 15° for the bead base side (44), and 10°.30' for the central portion (61) of the bead heel surface (60), the twisting was eliminated.

It is further believed that localized twisting of the bead core is eliminated by the placement of the two ends of the wire, (when the bead (20) is formed from a single strand of wire filament (26)), i.e., when the two ends terminate in proximity to each other and are circumferentially spaced in the annular configuration of the bead, but not overlapping. Normally, in passenger tires, the ends of the bead core filament (26) terminate near each other and circumferentially overlap for strength. The inventive bead core (20) is of such rigidity and strength that no such overlapping is required.

One method to verify the structural integrity of the bead core is to cut the cured tire's bead cores (20) from the tire structure and to lay them on a flat surface. Twisted bead cores will not lay flat, but will exhibit bends wherein the coil may only be touching the flat surface at three points of contact, the rest of the core being spaced from the surface.

The inventive bead core (20) preferably has a fifth layer having only two wire filaments shifted toward the axially inner side. This creates a somewhat flat top side (46) to the bead core (20) that is parallel to the tires axis. This flat top facilitates the building of some types of run-flat tires (10) in that a second ply can be laid on top of the beads during assembly on the tire building drum.

Such a bead structure is disclosed in U.S. Pat. No. 6,142,205 entitled "TIRE WITH COMPOSITE PLY STRUCTURE." To simulate this horizontal surface the intersection of perimeter lines (46, 50) and the portion of the perimeter line (46) at the fifth layer are substantially flat. Additionally, the fifth layer (38) having only two filaments is easily identifiable to insure that the axially inner edge (54) is readily identifiable and always properly located axially inward of edge (56).

The axially inner edge (54) of inclined base side (44) can have a diameter of about 0.05 to 0.06 inch greater than the bead hump (80) diameter. The bead (20) of the tire (10) can be slipped over the hump (80) of the rim (22), and once seated, the inner edge (54) of the bead base (44) is axially located inward of hump (80).

Another feature of the illustrated tire is the use of a tough rubber chafer component (66), which forms the bead heel. The use of a cut resistant rubber compound, which may be loaded with flexten or aramid pulp, makes possible the elimination of a conventional fabric toeguard.

The main function of a fabric toeguard is to hold in the turnup on lock-tie-in and low ply constructions. It also helps reduce tearing when tires are mounted.

The use of short fiber reinforcement allows for greater ease of manufacturing of toeguards and less scrap from component preparation. Laboratory data suggest improvements in compound flow, penetration resistance, and green strength.

The principles of this invention can be extended to other fabric reinforced components, given proper short fiber loading levels.

A short fiber reinforced toeguard can be prepared as any gum component is prepared, and therefore doesn't require special processing machinery (such as a fabric calender). Additionally, during fabric toeguard preparation any scrap that is generated cannot be reused, whereas short fiber reinforced compound scrap can be "worked away" or reprocessed.

Passenger and light truck tires ordinarily employ a hard rubber chafer in combination with a fabric toeguard wrapped around the bead cores and the plies. When designing a run-flat tire having an unusually wide base, it has been noticed that the fit between the tire (10) and rim (22) results in higher mounting forces. These higher mounting forces are an indication that the chafer rubber directly inward of the bead core (20) experiences much higher forces when the bead portions are stretched over the rim (22) as compared to conventional tires. Testing has shown that conventional tire mounting equipment causes tears in the toe (63) of the bead.

Dry mounting tests are more severe than wet mounting tests. The wet mounting uses a soapy solution to lubricate the tire bead, and the mounting tool or head slips on the tire bead surface. Nevertheless, tire bead damage can occur in either method of tire mounting.

The compound used in chafer (66) and described herein has been found to be extremely cut resistant. Most importantly, this chafer material is so durable that it eliminates the need for a separate fabric toeguard altogether. As used hereinafter, the chafer (66) is also referred to as a toeguard/chafer (66) because of its ability to incorporate both features into a single component.

The compound used in the toeguard/chafer of the invention is a polybutadiene (PBD)/polyisoprene blend. In the illustrated embodiment, a blend of cis-1,4-PBD and natural rubber (NR) is used. Those skilled in the art will recognize natural rubber or synthetic natural rubber (cis-1,4-polyisoprene), as well as other isoprenes and polybutadienes can be used in the invention as long as the desired compound properties are obtained.

Toeguard/chafer (66) may comprise a blend of 90-40 cis-1,4-polybutadiene (cis-1,4-PBD)/10-60 natural rubber (NR) that has a 300% modulus of 8 to 13 MPa, a tensile strength at break of 13 to 19 MPa, an elongation at break of 300 to 600%, room temperature Rebound of 48 to 58, a tan delta at 10% strain and 100° C. of 0.13 to 0.19, G' at 1% strain of 1900 to 2700 KPa, and a G' at 50% strain of 700 to 1100 KPa. The compound may include fiber and/or silica reinforcement.

For example, a compound having the general properties of toeguard/chafer (66) is a rubber blend, which comprises the following:

| Parts by weight per 100 parts rubber (phr) | Ingredients |
|---|---|
| 90–40 | Cis-1,4-polybutadiene Rubber |
| 10–60 | Polyisoprene |
| 0.5–6 | Aramid pulp |
| 40–100 | Carbon black |
| 0–12 | Silica |
| 0–30 | Silica coupling agent |

Plus conventional amounts of fatty acid, tackifiers, processing oils, waxes, antidegradants, zinc oxide, sulfur and sulfur containing accelerators such as sulfenamides, and when silica is used organosilane polysulfides having an average of about 2.5 to about 4.5 sulfur atoms in the polysulfide bridge,
such as bis-3(triethoxysilylpropyl) tetrasulfide.

The toeguard/chafer compound may be prepared, for example, by including conventional amounts of sulfur vulcanizing agents which may vary from about 1 to about 5 phr, antidegradants (including waxes) which may vary from about 1 to 5 phr, activators which may vary from about 2 to 8 phr, and accelerator which may vary from about 0.0 to 2.5 phr. Specifically, the amount of fatty acid may vary from about 0.25 to 3 phr, the amount of waxes may vary from about 0.5 to 4 phr, and processing oil may vary from 5–20 phr.

In applications for passenger tires, it is preferred that PBD comprise 60–80 phr, preferably 65–75 phr; polyisoprene comprise 20–40 phr, preferably 25–35 phr; Kevlar pulp (e.g. via DuPont Engineered Elastomer, Merge 6f722) comprise 0.5–3 phr, preferably 0.5–2 phr; carbon black comprise 60–80 phr, preferably 60–75 phr; and silica may comprise 0–20 phr, preferably 0–15 phr in the rubber composition.

Conventional types and amounts of silica coupling agents may be used, e.g. as described in U.S. Pat. No. 5,756,589 to Sandstrom et al., issued May 26, 1998, incorporated herein by reference in its entirety.

The rubber composition can be prepared by first mixing the ingredients exclusive of the sulfur and accelerator curatives in a non-productive mix stage(s), and the resultant mixture mixed with the sulfur and accelerator curatives in a productive mix stage, as is conventional in the art as illustrated by U.S. Pat. No. 4,515,713.

The properties of an exemplary composition of the invention are compared with the properties of rubber compositions that are conventionally used with fabric toeguards in the table below. Two separate trials were run.

TABLE I

| ID | | Fabric Rubber Control | | EXP2 1.5 phr Kelvar Pulp | |
|---|---|---|---|---|---|
| Description | | 1 | 2 | 1 | 2 |
| Rebound RT | % | 45.0 | 45.4 | 52.9 | 53.8 |
| 300% modulus | N/mm2 | 12.1 | 14.4 | 9.0 | 10.0 |
| Tensile strength at break | N/mm2 | 16.6 | 15.1 | 14.5 | 13.9 |
| Elongation | % | 366 | 337 | 400 | 409 |
| Din Abrasion Relative Volume Loss | | 96 | 105 | 58 | 78 |
| Interfacial Tear Appearance | | Medium knotty tear | Medium knotty tear | light to medium knotty tear | medium knotty tear |
| Avg. Load | | 162 | 174 | 157 | 148 |

The methods of testing for the properties disclosed in the Table are well known to those skilled in the art.

This chafer material, while first developed for use on run-flat tires having unusually high mounting loads, is believed to be universally adaptable to any chafer for auto, light truck, truck or farm, off-road tires where extreme toughness and cut resistance is needed, as well as other tire components where such properties are desirable.

Since the chafer of the invention eliminates the need for a fabric toeguard, its use in all auto and light truck tires is cost efficient.

Figure 6:
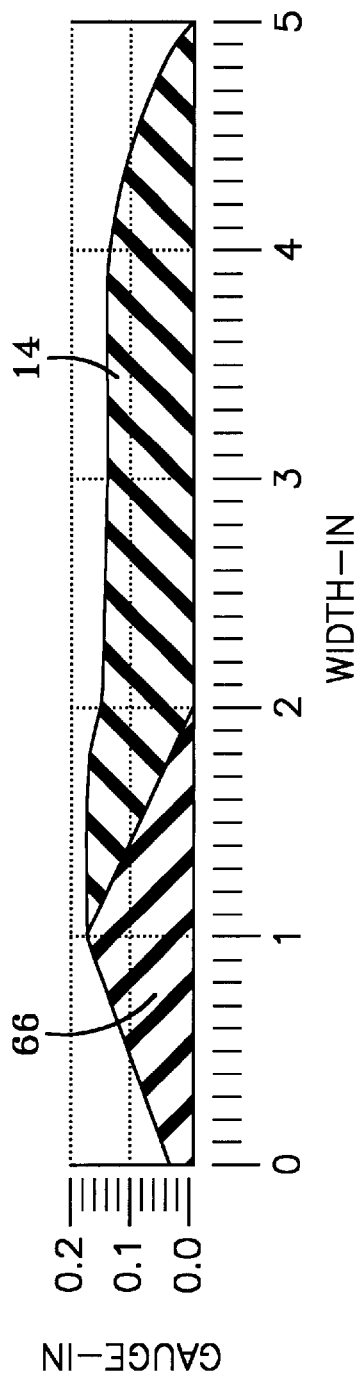
FIG. 6 and FIG. 7 are cross-sectional views of a chafer and sidewall rubber subassembly.
Figure 7:
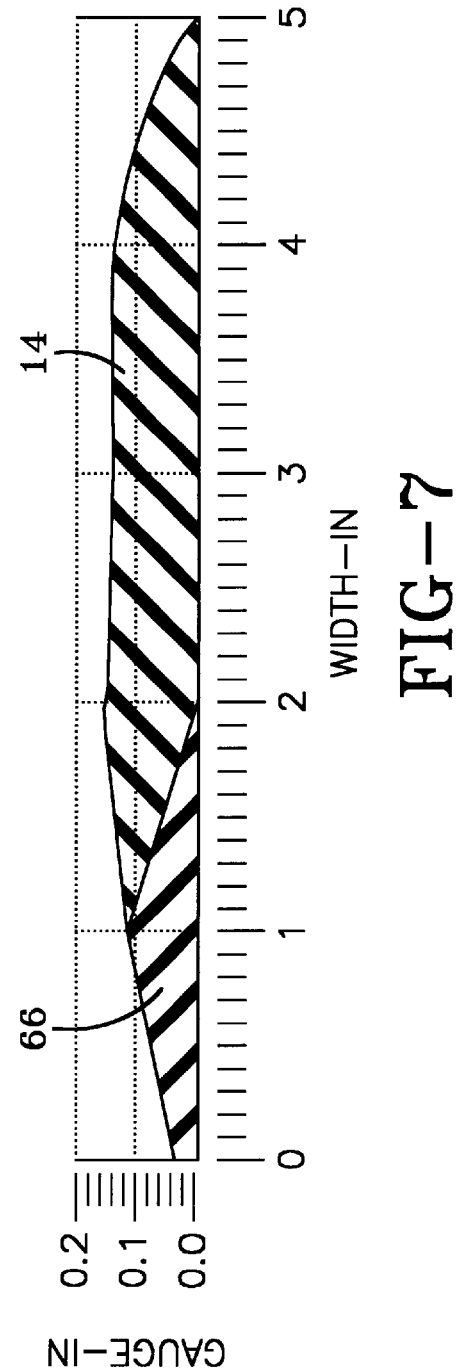

As shown in the cross-sectional views of FIGS. 6 and 7, the chafer (66) and sidewall rubber (14) can be preferably formed as a subassembly. This is most advantageous in the illustrated run-flat tire of the invention.

The chafer (66) of a prior art run-flat tire, when assembled with a sidewall compound (14) for a given tire size, had an exemplary maximum gauge thickness of 0.18 inch and a total width of 5.0 inches, the profile having a cross sectional area of 0.684 square inches as shown in FIG. 6. Using the fiber loaded chafer of the invention permits the overall maximum gauge thickness to be reduced by about 20% to about 1.1 inches, with the total cross-sectional area being reduced to about 0.6 square inches or 10%, as shown in FIG. 7. This 10% reduction in material reduces the weight of the subassembly by about 10%.

This weight reduction is significant, and when coupled with the elimination of the fabric toeguard, significant efficiency in manufacturing can be achieved. One of the advantages in the use of the fiber loaded chafer (66) is that it permits the component to be cut and spliced using any conventional means such as a hot knife. The absence of a fabric layer is most desirable in terms of cutting and splicing of such a subassembly.

While the above beneficial features of the chafer (66) have been employed in a run-flat tire having a specific bead core design, it is understood that the invention is not limited to such tires.

In the development of the fiber loaded tire component of the invention, a unique fiber loading was tested which produced final compound properties that have not been previously observed.

Initial compound evaluations using a DuPont Engineered Elastomer, a Kevlar/polymer masterbatch for the fiber loading, showed better processing, equivalent or better reinforcement, equivalent or better dispersion and improved fiber adhesion as compared to existing methods of fiber incorporation.

Kevlar reinforcement of the chafer compound reduced the flow of the compound and therefore maintains integrity of the toeguard gauge. It has been shown in previous studies with Kevlar, and other short fibers, that die swell and compound flow are reduced with the addition of short fibers.

The Engineered Elastomer is available as a SBR (6f724) or natural rubber (6f722) masterbatch (30 phr Kevlar). Both the natural rubber and SBR masterbatches were initially evaluated at Kevlar loading levels of 0, 1.5, 3.0 and 4.5 phr. In the Examples the Kevlar was added on top of the formulation, maintaining a 100 part level of polymer by partially replacing the respective polymer with that from the masterbatch.

Loading levels varying from 0 to 4.5 phr Kevlar were chosen in an attempt to obtain a wide range of values. In order to evaluate the processing, the compounds were mixed using standard mixing procedures. Banbury and mill processing of the fiber-loaded compounds was approximately equivalent to the control. However, the NR Engineered Elastomer seemed to disperse more easily in the compounds than the SBR Engineered Elastomer.

Standard compound screening tests, as well as tests to simulate the toeguard applications, were conducted. Testing included rheometer, Mooney viscosity, green strength, stress relaxation, penetration, spider flow, dynamic properties, and tensile. As compared to the control, compounds containing the natural rubber Engineered Elastomer demonstrated comparable Mooney (ML1+4, minimum, maximum) values while those containing the SBR Engineered Elastomer resulted in slightly higher Mooney values. As expected, the compounds loaded with the Engineered Elastomer demonstrated increased cured and green modulus. The increase in compound modulus, however, was at the expense of tensile strength and elongation. All of the compounds evaluated demonstrated comparable rheometer cure times.

With increased loading levels of the Engineered Elastomer (either NR or SBR), significant increases in compound green strength were demonstrated. At Kevlar loading levels of 4.5 phr (19.57 phr Engineered Elastomer) the compounds demonstrated green strength values more than double that of the control. Penetration, as measured by the Penetration Energy test, was improved with addition of the Engineered Elastomer, while the Bridgestone Penetration test results were comparable to the control. Compound flow during cure, as measured by the Spider Flow test, was significantly reduced with addition of the SBR Engineered Elastomer and equal to slightly reduced by addition of the NR Engineered Elastomer.

Addition of the Engineered Elastomer had no significant impact on laboratory Banbury and mill processing. However, the SBR Engineered Elastomer did not disperse as well as the NR Engineered Elastomer, and may require the addition of a remill stage to obtain adequate fiber dispersion.

The invention is further illustrated with reference to the following examples.

EXAMPLE 1

This example describes various screening compounds evaluated to determine dispersion of fibers in the compounds as well as some compound properties. A natural rubber (NR)/styrene butadiene rubber blend (SBR) cis-1,4-polybutadiene (PBD) was used as a base compound in the evaluations.

Good fiber dispersion is necessary for consistent compound performance. If good dispersion of the fibers is not achieved, the compound may fail prematurely or behave inconsistently. A quick, qualitative measure of dispersion can be obtained by visual inspection of the compound edges and surface after each mixing stage. When good fiber dispersion is achieved, no fibers can be seen in the compound. Though the SBR and NR Engineered Elastomer loaded compounds had similar mixing and mill ratings, the NR Engineered Elastomer appeared to disperse more easily than the SBR Engineered Elastomer. No visible fibers were detected in the NR Engineered Elastomer compounds with 1.5 and 3 phr Kevlar loading after any of the mixing stages. Visible fibers were observed on the edges and surface of the compound containing 4.5 phr Kevlar from the NR Engineered Elastomer. However, fibers were visible in each of the SBR Engineered Elastomer loaded compounds after both the first and second non-productive stages, although the number of visible fibers significantly decreased between the first and second non-productive stages and no fibers were observed in the productive compound.

Surprisingly, the NR and SBR Engineered Elastomers demonstrated different compound processing characteristics and compound physical properties. The SBR Engineered Elastomer loaded compounds required slightly more mix work than the NR Engineered Elastomer loaded compounds, indicating that they had a higher viscosity. Additionally, as compared to the control, the compounds containing the NR Engineered Elastomer demonstrated comparable to slightly lower Mooney (ML1+4, minimum and maximum) and rheometer torque (minimum and maximum) values while the compounds containing the SBR Engineered Elastomer demonstrated increased Mooney and rheometer torque values with increased loading. Additionally, compound flow during cure, as measured by the spider flow test, was significantly reduced with the addition of the SBR Engineered Elastomer and equal to slightly reduced by the addition of the NR Engineered Elastomer. At a loading level of 4.5 phr Kevlar (19.57 phr SBR Engineered Elastomer) compound flow was approximately half that of the control. This indicates that the addition of the SBR Engineered Elastomer to the compound results in increased compound resistance to flow and shearing. Therefore, compounds loaded with the SBR Engineered Elastomer may better maintain the toeguard gauge and shape than the use of the control compound or a compound containing the NR Engineered Elastomer.

As expected, the addition of the Engineered Elastomer to the compounds results in increased compound modulus. However, with increased Engineered Elastomer (and therefore increased Kevlar) loading levels, decreases in tensile strength and elongation result.

Penetration, as measured by the penetration energy test, was significantly improved with the addition of the Engineered Elastomer. This test measures the energy required for a conical element to penetrate a cured block of compound to a specified depth. However, the Bridgestone Penetration test, which is a blade penetration test, indicated equivalent blade penetration depths for the Engineered Elastomer loaded compounds as compared to the control. Therefore, this suggests that the addition of the Engineered Elastomer may very well improve the gum toeguard penetration resistance although it will not likely improve the penetration resistance to sudden penetration by sharp objects.

TABLE I

Compounds and Properties

| | Compound | | | | | | |
|---|---|---|---|---|---|---|---|
| | 1 | 2 | 3 | 4 | 5 | 6 | 7 |
| | | | | Description | | | |
| | Control | NR Engineered Elastomer | NR Engineered Elastomer | NR Engineered Elastomer | SBR Engineered Elastomer | SBR Engineered Elastomer | SBR Engineered Elastomer |
| SBR (phr) | 30 | 30 | 30 | 30 | 24.98 | 19.96 | 14.93 |
| Natural Rubber (phr) | 40 | 34.98 | 29.96 | 24.93 | 40 | 40 | 40 |
| 6F722 (phr) | 0 | 6.52 | 13.04 | 19.57 | 0 | 0 | 0 |
| 6F724 (phr) | 0 | 0 | 0 | 0 | 6.52 | 13.04 | 19.57 |
| Kevlar (phr) (From 6F724) | 0 | 1.5 | 3.0 | 4.5 | 1.5 | 3.0 | 4.5 |
| PBD (phr) | 30 | 30 | 30 | 30 | 30 | 30 | 30 |
| ML 1 + 4 | | | | | | | |
| IV | 97.3 | 97.2 | 95.7 | 95.1 | 105 | 112.1 | 119.9 |
| Maximum | 97.3 | 97.2 | 95.7 | 95.1 | 105 | 112.1 | 119.9 |
| Minimum | 61.7 | 60.5 | 57.5 | 55.4 | 65 | 68.2 | 71.3 |
| ML 1 + 4 | 61.7 | 60.5 | 57.5 | 55.4 | 65 | 68.2 | 71.3 |
| Penetration Energy | | | | | | | |
| 0–5 mm (J) | 0.12 | 0.14 | 0.17 | 0.18 | 0.15 | 0.17 | .20 |
| 0–10 mm (J) | 0.79 | 0.93 | 1.05 | 1.15 | 0.93 | 1.09 | 1.25 |
| 0–15 mm (J) | 2.19 | 2.58 | 2.82 | 3.03 | 2.53 | 2.93 | 3.24 |
| 0–20 mm (J) | 4.31 | 4.89 | 5.20 | 5.54 | 4.78 | 5.44 | 5.89 |
| UTS-W/Grain | | | | | | | |
| 100% (N/mm$^2$) | 2.44 | 3.66 | 4.90 | 6.15 | 4.09 | 5.22 | 6.60 |
| 200% (N/mm$^2$) | 5.79 | 6.63 | 7.32 | 8.14 | 7.14 | 7.79 | 8.62 |
| 300% (N/mm$^2$) | 10.30 | 10.95 | 11.33 | 11.94 | 11.76 | 12.07 | 12.82 |
| 400% (N/mm$^2$) | 14.88 | 15.28 | 15.41 | * | 16.37 | 16.35 | 16.68 |
| Tensile Strength (N/mm$^2$) | 17.39 | 16.60 | 15.52 | 14.59 | 17.40 | 16.7 | 16.94 |
| Elongation @ Break (%) | 459 | 439 | 406 | 374 | 430 | 411 | 404 |

TABLE I-continued

Compounds and Properties

| | Compound | | | | | | |
|---|---|---|---|---|---|---|---|
| | 1 | 2 | 3 | 4 | 5 | 6 | 7 |
| | | | | Description | | | |
| | Control | NR Engineered Elastomer | NR Engineered Elastomer | NR Engineered Elastomer | SBR Engineered Elastomer | SBR Engineered Elastomer | SBR Engineered Elastomer |
| UTS - Against the Grain | | | | | | | |
| 100% (N/mm$^2$) | 2.30 | 2.60 | 2.79 | 3.12 | 2.60 | 2.90 | 3.07 |
| 150% (N/mm$^2$) | 3.62 | 3.97 | 4.19 | 4.50 | 4.01 | 4.35 | 4.51 |
| 200% (N/mm$^2$) | 5.42 | 5.73 | 5.89 | 6.11 | 5.84 | 6.12 | 6.20 |
| 300% (N/mm$^2$) | 9.79 | 9.89 | 9.80 | 9.83 | 10.20 | 10.32 | 10.18 |
| 400% (N/mm$^2$) | 14.38 | 14.16 | 13.68 | 13.11 | 14.71 | 14.56 | 13.95 |
| Tensile Strength (N/mm$^2$) | 16.43 | 15.42 | 13.81 | 12.67 | 15.89 | 15.2 | 14.15 |
| Elongation @ Break (%) | 453 | 436 | 406 | 383 | 435 | 423 | 408 |
| Bridgestone Penetration - Penetration into Sample (inches) | | | | | | | |
| With the Grain - Avg. | 0.47 | 0.45 | 0.45 | 0.46 | 0.46 | 0.46 | 0.45 |
| Against the Grain - Avg. | 0.47 | 0.46 | 0.46 | 0.46 | 0.46 | 0.47 | 0.46 |
| Spider Flow | | | | | | | |
| Total Flow (in.) | 8.5 | 8.2 | 8.6 | 8.2 | 6.1 | 4.5 | 3.8 |
| Bridgestone Penetration - Penetration into Sample (inches) | | | | | | | |
| With the Grain - Avg. | 0.47 | 0.45 | 0.45 | 0.46 | 0.46 | 0.46 | 0.45 |
| Against the Grain - Avg. | 0.47 | 0.46 | 0.46 | 0.46 | 0.46 | 0.47 | 0.46 |

EXAMPLE 2

A representative compound of the invention, used as a toeguard/chafer compound in the following examples is illustrated in Table II.

TABLE II

COMPOUNDS

| INGREDIENT | LEVEL (phr) |
|---|---|
| Cis-1,4-Pbd | 70 |
| Natural Rubber | 25 |
| Kelvar Pulp/NR (1.5 phr fiber/5 phr NR) Masterbatch | 6.5 |
| Carbon Black (N326) | 65 |
| Silica | 10 |
| Process Oil | 12 |
| Antidegradents | 2.75 |
| Zinc Oxide | 6.5 |

The compound contained conventional sulfur and sulfur containing accelerators and was mixed as is conventional in the art as described above.

EXAMPLE 3

The properties of the compounds of the invention in the toeguard/chafer of an Eagle LS tire construction were compared with properties of the toeguard/chafer of a commercial tire and with a fabric toeguard used in prior art constructions.

In the development of the EMT tire it was found that conventional monofil fabric toeguards tore easily when an EMT tire was mounted or dismounted, which became a serious problem when the tear went into the rayon ply. The fabric toeguard made the condition worse when it tore across the face of the bead and into the rayon ply. Two new, tough compounds have been developed and built into several tire constructions, a gum compound, and the same compound with the addition of Kevlar pulp. A mount trial was run at the Goodyear Akron test center comparing tires built to Eagle Aquasteel (EAS) EMT specifications with a fabric toeguard, a tire built to Eagle LS (ELS) EMT specifications with a fiber loaded gum toeguard using the gum compound of the invention, and a commercial tire made with a gum toeguard. All tires were built to size P225/60R16. One tire from each construction was dry mounted using a metal head on the machine to duplicate poor mounting practice (but very common) and a second tire was mounted using tire lube on a plastic head equipped machine. All tires were mounted/dismounted three times and inspected after each mount/dismount.

In the Table III, tears in the ply represent a non-repairable condition, whereas rubber damage indicates superficial, nonconsequential damage.

TABLE III

| | TIRE NAME | | | | | |
|---|---|---|---|---|---|---|
| | 1ST | | 2ND | | 3RD | |
| EAS EMT | MOUNT | DISMOUNT | MOUNT | DISMOUNT | MOUNT | DISMOUNT |
| Fabric - dry | OK | ½" tear to ply | OK | 1" tear to ply | OK | ½, ½, 1" tears to ply |
| Fabric - lube | ½" tear to ply | OK | ½" tear to ply | OK | ½" tear to ply | OK |
| COMMERCIAL | | | | | | |
| Gum - dry | 2" thin rubber | OK | 2" thin rubber | OK | ½", 2" thin rubber | OK |
| Gum - lube | OK | OK | OK | OK | OK | OK |
| ELS EMT | | | | | | |
| Gum - dry | 3", 2", 1" rubber | OK | 270 deg rubber | OK | 270 deg rubber | OK |
| Gum - lube | OK | OK | OK | OK | OK | OK |
| Gum - dry | 1", ⅔" rubber | OK | 180 deg rubber | OK | 270 deg rubber | OK |
| Gum - lube | OK | OK | OK | OK | ½" rubber | OK |
| Gum - dry | 180 deg rubber | OK | 180 deg rubber | OK | 180 deg rubber | OK |
| Gum - lube | OK | OK | OK | OK | OK | OK |
| Fiber - dry | 3" rubber | OK | 3" rubber | OK | 3" rubber | OK |
| Fiber - lube | OK | OK | OK | OK | OK | OK |
| Fiber - dry | ½" rubber | OK | 270 deg rubber | OK | 270 deg rubber | OK |
| Fiber - dry | ½" rubber | OK | 270 deg rubber | OK | 270 deg rubber | OK |

CONCLUSIONS

The Eagle Aquasteel EMT built with the fabric toeguard top bead was easy to tear when the tire was mounted or dismounted, even when properly lubed. The commercial tire is more resistant to bead damage even though it has a gum toeguard. The minor tears that occur do not reach into the plies.

The Eagle LS EMT with the new toeguard compounds is resistant to damage. The damage that occurs is confined to the toe and does not go to the ply.

The tires with the fiber loaded toeguard showed less abrasion damage on the inside of the bead than the tires with the gum toeguard.

What is claimed is:

1. A pneumatic radial ply tire (10) for mounting onto a 5° tapered bead seat design rim (22), the tire (10) having a nominal rim diameter NRD, a tread (12), a pair of reinforcing belts (39) located radially inward of the tread (12), a pair of sidewalls (14) extending radially inward from the tread (12), and a tire carcass structure (16) having a pair of bead portions (25) extending radially inwardly from each sidewall (14) each bead portion (25) having a substantially inextensible bead core (20) and at least one cord reinforced ply (17) extending from one bead portion (25) to the opposite bead portion (25), the tire (10) characterized by:

each bead core (20) has a generally flat base (44) having at least 6 wire ends when viewed in cross-section, the flat base (44) being inclined relative to an axis of rotation of the bead at an angle of at least 15° as measured from an axially inner location (54) of the flat base (44) to an axially outer location (56) wherein radially inward of the bead core flat base (44), the bead portion (25) has a radially inner bead heel surface (60), the radially inner bead heel surface (60) having a toe portion (63) and a heel portion (65) and disposed between the bead toe (63) and heel (65) is a central portion (61), the central portion (61) being inclined at an angle of at least 10° relative to the axis of rotation of the bead and being at least 4° less than the angle of the flat base side, the flat base side (44) having an axial width of at least 50% of the axial width of bead heel surface (60).

2. The tire (10) of claim 1 wherein each bead core flat base wire end is at least 0.050 inches (0.127 cm) in diameter.

3. The tire (10) of claim 2 wherein the bead core (20) is made of a monofilament wire (26) having at least two layers, the two ends of the wire being circumferentially spaced and non-overlapping.

4. The tire (10) of claim 1 wherein the bead seat (62) of the rim (22) is adjacent and axially outward of a bead hump (80), the bead hump (80) of the rim (22) having a diameter of NRD+d and the diameter of the bead base (44) axially innermost location (54) is 0.050 to 0.060 inch (0.127 to 0.152 cm) greater than NRD+d.

5. The tire (10) of claim 4 wherein the bead core (20) is encapsulated in uncured rubber prior to assembly into the tire.

6. The tire (10) of claim 5 wherein the bead core (20) has at least one axially inner wire or wire winding and at least one axially outer wire or wire winding and the planes tangent to the at least one axially inner wire or wire winding and the at least one axially outer wire or wire winding are parallel to each other and perpendicular to the axis of rotation after the tire is cured.

7. The tire (10) of claim 6 wherein the bead core (20) when viewed in any cross-section plane has adjoining layers of wire ends nested together.

* * * * *